A. B. DIEDRICH.
LEVER LOCK.
APPLICATION FILED AUG. 11, 1909.

997,970. Patented July 18, 1911.

MODEL.

Witnesses
O. B. Baenziger.
E. M. Brown.

Inventor
Albert B. Diedrich.
By Edward N. Pagelsen.
Attorney

UNITED STATES PATENT OFFICE.

ALBERT B. DIEDRICH, OF DETROIT, MICHIGAN.

LEVER-LOCK.

997,970.

Specification of Letters Patent. Patented July 18, 1911.

Application filed August 11, 1909. Serial No. 512,296. (Model.)

*To all whom it may concern:*

Be it known that I, ALBERT B. DIEDRICH, a citizen of the United States, and a resident of Detroit, in the county of Wayne and State of Michigan, have invented a new and Improved Lever-Lock, of which the following is a specification.

Figure 1:
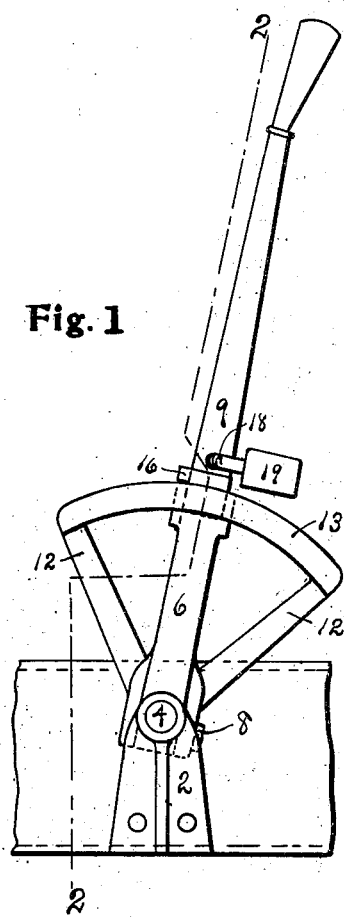
Figure 2:
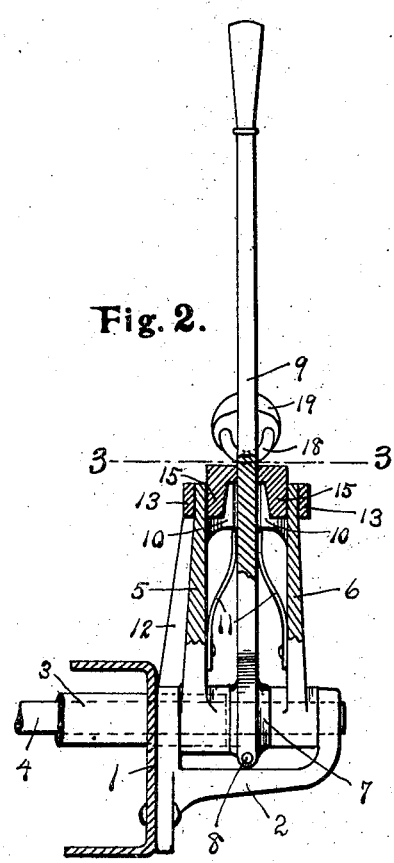
Figure 4:
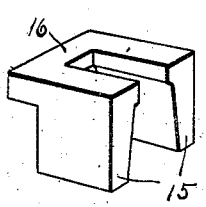
Figure 3:
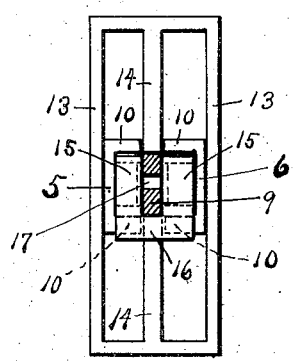

My invention relates to means for locking levers, especially such as control the operation of automobiles, and its object is to provide a simple, strong and efficient device whereby unauthorized persons may be prevented from operating the device controlled by the lever.
In the accompanying drawings Figure 1 is a side elevation of the transmission-control levers of one type of automobiles with my improved lever-lock in position. Fig. 2 is a cross section on the line 2—2 of Fig. 1.
Fig. 3 is a plan on the line 3—3 of Fig. 2. Fig. 4 is a perspective view of the locking-block.

Similar reference characters refer to like parts throughout the several views.
In the drawings the invention is shown embodied in a controlling device for a pair of operating levers. The frame 1 has secured to it a bracket 2 in which is journaled a sleeve 3 and a shaft 4. To the sleeve is secured an operating lever 5 and to the shaft, an operating lever 6. Mounted on the shaft is a sleeve 7 carrying a pin 8, on which pin is pivoted the lower end of the controlling lever 9.
The operating levers 5 and 6 have inwardly extending jaws 10 which are adapted to receive the controlling lever 9 as it is swung laterally toward one or the other. Springs 11 mounted on these operating levers are adapted to hold the controlling lever approximately central. Arms 12 on the bracket 2 carry the guide bars 13 and the stop bars 14, the latter separated by a gap.

The springs 11 normally hold the lever 9 in the gap between the ends of the bars 14. The operating levers 5 and 6 are at neutral position so long as the controlling lever is in this gap and during this time, the machinery controlled thereby is at rest. The levers 5 and 6 are for the purpose of adjusting movable parts, and the controlling lever 9 is swung laterally from neutral position into between the jaws 10 of either operating lever, as desired, for the purpose of actuating the selected operating lever. The controlling lever will remain in engagement with the selected operating lever until it is again at central position when the spring 11 will swing it to the neutral position shown.

The locking device comprises a yoke formed of the sides 15 and cross bar 16. Each side is adapted to fit between the jaws 10 of an operating lever and thus prevents the controlling lever from swinging laterally, and at the same time holds the operating lever central. The cross bar connects the sides and is a matter of convenience as the sides would operate as well if separate. To prevent the lock being removed, a hole 17 is formed in the controlling lever through which the hasp 18 of the padlock 19 passes. If the key to the lock is lost, the hasp can be cut off and a new lock substituted.

The construction of the automobiles to which this lock is adapted is such that both the levers 5 and 6 cannot move together. As a rule, one lever can move down to the left (Fig. 1) from the central position and the other lever down to the right. In such construction there is no possibility of the two levers 5 and 6 moving to the left (Fig. 1) and thus carry the cross-bar 16 from below the padlock.

This invention is adapted for locking devices for levers of any description, automobile-transmission levers being shown because of their universal use.

Having now explained my improvements, what I claim as my invention and desire to secure by Letters Patent is:—

1. In a device of the class described, the combination with a pair of operating levers having inwardly extending jaws, pivots for said levers, a controlling lever mounted concentrically with the operating levers, parallel guide and stop bars for said levers, and a securing device engaging between the jaws of the operating levers to hold the controlling lever in engagement with the stop bars.

2. In a device of the class described, the combination of an operating lever having projecting jaws, a pivot for the same, a controlling lever mounted concentrically with the operating lever, parallel guide and stop bars for said levers, and a securing device adapted to engage between the jaws of the operating lever to hold the controlling lever in engagement with the stop bars.

In testimony whereof I have signed this specification in the presence of two subscribing witnesses.

ALBERT B. DIEDRICH.

Witnesses:
HOMER D. MacDONALD,
FRED. A. STRENGSON.